United States Patent [19]

Jackson

[11] Patent Number: 4,814,076

[45] Date of Patent: Mar. 21, 1989

[54] SELF-CLEANING FILTER FOR INSERTION INTO A PRESSURIZED PIPE

[75] Inventor: Philip Jackson, Paris, France

[73] Assignee: E. Beaudrey & Cie, Paris, France

[21] Appl. No.: 143,634

[22] Filed: Jan. 13, 1988

[30] Foreign Application Priority Data

Jan. 16, 1987 [FR] France ................. 87 00430

[51] Int. Cl.$^4$ ............................................. B01D 46/04
[52] U.S. Cl. ................... 210/158; 210/380.1; 210/397; 210/445; 55/290
[58] Field of Search ............ 210/158, 159, 345, 380.1, 210/380.3, 392, 395, 397, 445; 55/285, 290, 390

[56] References Cited

U.S. PATENT DOCUMENTS

| | | | |
|---|---|---|---|
| 2,184,177 | 12/1939 | Burrell | 210/152 |
| 2,199,709 | 5/1940 | McNeal | 210/152 |
| 3,864,256 | 2/1975 | Hultsch et al. | 210/380.3 X |
| 4,093,435 | 6/1978 | Marron et al. | 55/390 X |
| 4,169,792 | 10/1979 | Dovel | 210/158 X |
| 4,481,021 | 11/1984 | Kinney et al. | 55/290 |

FOREIGN PATENT DOCUMENTS

| | | | |
|---|---|---|---|
| 0241419 | 12/1909 | Fed. Rep. of Germany | 55/290 |
| 1300244 | 6/1962 | France . | |
| 2564745 | 11/1985 | France . | |
| 131755 | 9/1919 | United Kingdom . | |
| 1083770 | 9/1967 | United Kingdom . | |

*Primary Examiner*—Charles Hart
*Attorney, Agent, or Firm*—Charles E. Brown; Charles A. Brown

[57] ABSTRACT

A filter that can be inserted into a pressurized pipe comprises a filter body designed to be connected to each of two consecutive section of the pipe. Inside the filter body is a generally circular filter member which is rotatable about an axis of the filter body, into which it projects cantilever-fashion. A rim on the filter member carries a rack meshing with a drive wheel. A suction unit on the upstream side of the filter member and disposed along a radius of the filter member is connected to a take-off pipe.

9 Claims, 1 Drawing Sheet

U.S. Patent    Mar. 21, 1989    4,814,076
FIG.1
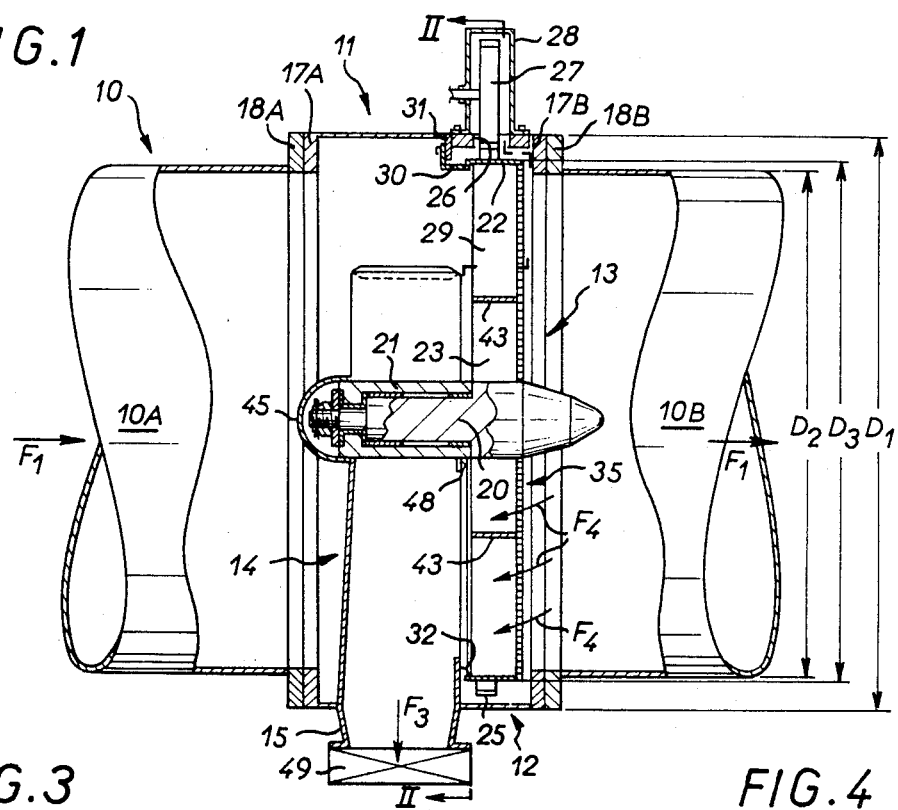
FIG.3
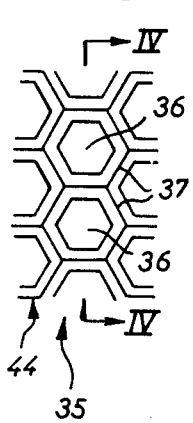
FIG.2
FIG.4
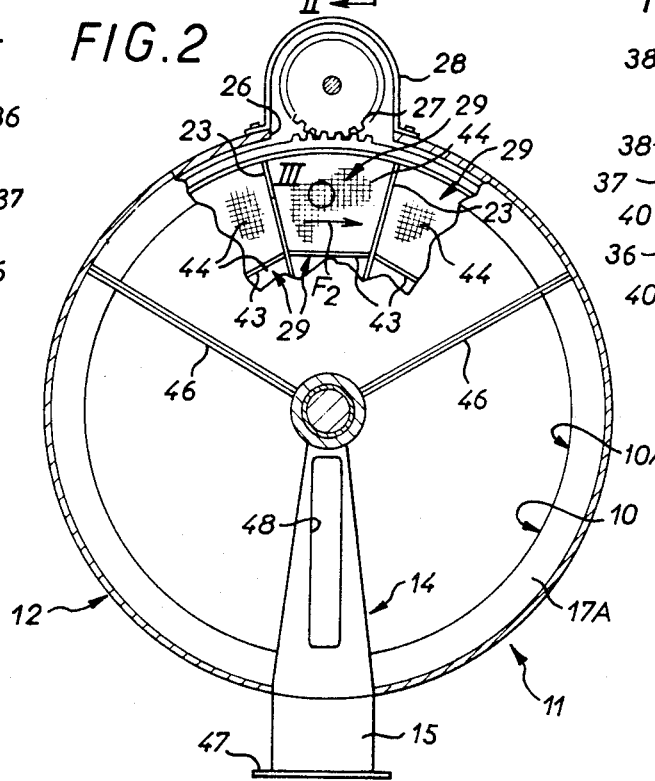

SELF-CLEANING FILTER FOR INSERTION INTO A PRESSURIZED PIPE

BACKGROUND OF THE INVENTION

1. Field of the invention

The present invention is generally concerned with filters employed to clean a fluid circulating in a pressurized network and likely to entrain debris, detritus or foreign bodies.

This is the case, for example, with industrial effluent which can entrain debris or detritus of man-made origin or vegetable matter, for example algae of a more or less fibrous or filamentary nature, or animals such as mussels, molluscs or fish, likely to proliferate on the downstream side if not previously separated out.

2. Description of the prior art

The filters employed to clean such industrial effluent have in practise to be inserted into the pipe carrying same and they generally comprise, in a filter body adapted to be connected to two consecutive sections of a pipe, a filter member designed to be inserted into the flow to be treated and itself comprising a filter element having openings adapted to allow free circulation of the liquid whereas its solid parts are adapted to hold back debris, detritus or foreign bodies carried in the liquid.

The present invention is more particularly directed to the case where, to obtain a so-called self-cleaning filter, provision is made for systematically eliminating such debris, detritus and foreign bodies.

The direction of flow is systematically reversed at appropriate times in some installations which, ignoring internal valves necessary for their functioning, have the advantage of having virtually no moving parts.

However, this entails taking temporarily out of service either the filter as a whole or at least one section of the filter, to the detriment of overall efficiency.

In other installations which have no moving parts at all, the required elimination of debris, detritus and foreign bodies held back by the filter member is very simply obtained by construction features whereby the incoming flow washes over the filter element.

If the filter member comprises a cylindrical screen as the filter element, for example, the filter body is disposed around the screen spiral staircase-fashion and the flow to be treated enters the filter body tangentially so that the speed vector of the incoming flow is oblique to the surface of the screen and thus has not only a component perpendicular to its surface, necessary for the flow to pass through it, but also a tangential component by virtue of which the debris, detritus and foreign bodies that are held back are systematically entrained.

Although satisfactory in other respects, these installations are mostly relatively bulky and require a change in the direction of the flow to be treated because although the flow enters tangentially it necessarily leaves axially, which means that they are sometimes difficult to install, especially in existing installations, with the result that they do not suit all applications.

In other installations a mechanical cleaning device is used to achieve the required self-cleaning function.

At present, the filter member usually employs as the filter element a fixed part-cylindrical screen near which is a counterflow (i.e. on the upstream side relative to the corresponding flow) suction unit which discharges to a drain via a take-off pipe and which is rotatable about the axis of the filter member.

One disadvantage of such installations using a mechanical cleaning device is that they give rise to non-negligible head losses.

A general object of the present invention is an arrangement whereby these disadvantages can be minimized or even eliminated.

SUMMARY OF THE INVENTION

The present invention consists in a filter adapted to be inserted into a pipe, comprising a filter body adapted to be connected to each of two consecutive sections of the pipe and, in the filter body, a generally circular filter member rotatable about an axis of the filter body, into which it projects cantileverfashion, a rim on the filter member, a rack on the rim, a drive wheel meshing with the rack, a suction unit on an upstream side of and disposed along a radius of the filter member and a take-off pipe connected to the suction unit.

Thus in accordance with the invention the filter member rotates and the suction unit is fixed.

Apart from an advantageous reduction in the overall axial dimension necessary for a filter member of this kind, as a result of which the filter body has an axial length at most approximately one-half the diameter of the pipe to which it is to be fitted, which advantageously facilitates installation in the pipe, the head losses are advantageously reduced.

The filter member preferably comprises a filter element the openings in which are each individually delimited by parallel elongate passages substantially perpendicular to the plane of the openings.

Experience has shown that suuh passages have the advantage of reducing the turbulence of the flow passing through them, offsetting the inevitable turbulence resulting from rotation of the filter member in the flow and the insertion into the flow of the suction unit on the upstream side of the filter member.

The use of a parallel passage filter element of this kind is advantageously combined with the arrangement in which the filter member rotates and is associated with a fixed suction unit on its upstream side.

Also, as the space inside the rim of the filter member necessarily has some depth, it advantageously lends itself to storing debris, detritus and foreign bodies held back by the corresponding filter panel between two consecutive operations of the suction unit.

This internal space is advantageously divided into compartments to favor and make more reliable the retention of debris, detritus and foreign bodies.

Thus debris, detritus and foreign bodies cannot impede rotation of the filter member necessary for use of the suction unit, enhancing overall reliability.

The characteristics and advantages of the invention will emerge from the following description given by way of example with reference to the appended diagrammatic drawings.

BRIEF DESCRIPTION OF THE DRAWINGS

FIG. 1 is a view in elevation and axial cross-section of a pipe equipped with a filter in accordance with the invention.

FIG. 2 is a view of this filter in transverse cross-section on the line II—II in FIG. 1.

FIG. 3 shows to a larger scale the detail marked III on FIG. 2.

FIG. 4 is a view in axial cross-section on the line IV—IV in FIG. 3.

DESCRIPTION OF THE PREFERRED EMBODIMENTS

As shown in the figures, and more particularly in FIG. 1, a filter 11 is inserted into a pressurized pipe 10, between two consecutive sections 10A and 10B of the pipe, one on its upstream side and the other on its downstream side.

The filter 11 comprises, in a filter body adapted to be connected to the two consecutive sections 10A and 10B of the pipe 10, a generally circular filter member 13 transversely disposed in the filter body 12 and rotatable about the axis thereof and, on the upstream side of the filter member 13, a suction unit 14 disposed along a radius of the filter member 13 and to which is connected a take-off pipe 15.

The filter body 12 is generally cylindrical, its diameter D1 being just sufficient for that D3 of the filter member 13 to be slightly greater than the diameter D2 of the pipe 10.

Flanges 17A and 17B are welded onto the ends of the cylinder enabling it to be bolted to similar flanges 18A and 18B at the ends of the sections 10A and 10B of the pipe 10.

The filter body 12 has an axial length which is approximately one-half the diameter D2 of the pipe 10.

The filter member 13 projects cantilever-fashion into the filter body 12, being disposed at the end of a shaft 20 mounted to rotate in a hub 21 fastened to the filter body 12.

The filter member 13 is disposed in the immediate vicinity of one transverse end of the filter body 12, in this case the downstream end of the filter body 12 as embodied in the flange 17B. Around its periphery is a rim 22 joined to the shaft 20 by radial members 23 which are flat and disposed in the axial direction. On its outside is a rack 25 which, by means of an aperture 26 in the filter body 12, meshes with a drive wheel 27 disposed outside the filter body 12 inside a pressure-resistant housing 28 projecting locally from the surface of the filter body 12.

To prevent the flow to be treated bypassing the filter member 13 (the flow direction being from left to right in FIG. 1 as shown by arrows F1), a seal is provided between the filter body 12 and the rim 22 on the filter member 13.

This seal is formed by an angle-iron 30 attached by its transverse web (as defined relative to the axis of the assembly) to the filter body 12 by means of an upstanding edge 31 of the latter extending radially towards the axis. The other, axial web of the angle-iron is inserted into the rim 22 of the filter member 13.

The seal is interrupted locally in line with the suction unit 14, the necessary sealing being obtained at this location by a flexible material lip seal 32 carried by the suction unit 14 and disposed axially inside and near the rim 22 of the filter member 13.

The filter member 13 comprises a substantially circular transverse filter element 35 between the rim 22 and the shaft 20, on the downstream side of the radial members 23.

The openings 36 in the filter element 35 are each individually delimited by parallel elongate passages 37 perpendicular to the plane of the openings, that is to say substantially parllel to the axis of the assembly.

By virtue of arrangements described in more detail in a copending application filed this day, the passages 37 delimiting the openings 36 are contiguous so that the overall structure is like a honeycomb and the passages have a hydrodynamic profile.

From their inlet 38 on the upstream side to their outlet 39 on the downstream side each of the passages 37 defines, internally, first a convergent section 40 and then a divergent section 41, the median throat defining the corresponding opening 36.

The openings 36 of the filter element 35 of the filter member 13 have a hexagonal contour.

The radial members 23 of the filter member 13 divide the space inside the rim 22 into angular sectors and each of these is in turn subdivided into at least two compartments 29 by a median partition 43 joining the corresponding radial members 23 and substantially tangential to a common circumference of the assembly.

In this way the space inside the rim 22 is divided transversely into a plurality of compartments 29.

The filter element 35 is itself divided into as many filter panels 44 as there are compartments 29 inside the rim 22, there being one filter panel 44 for each compartment 29.

By virtue of arrangements like those described in the copending application filed this day, each of the filter panels 44 can be laid against a frame which is provided with intermediate bars and is appropriately attached to the walls defining the corresponding compartment 29. It is appropriately attached to a frame of this kind, for example by means of clips looped around these bars and passing through its openings.

As an alternative to this, each of the filter panels 44 may be self-supporting, being itself appropriately attached to the walls of the corresponding compartment 29 of the filter member 13.

In the embodiment shown the radial members 23 of the filter member 13 and the intermediate walls 43 which join them in pairs extend axially over all the length of the rim 22, but this is obviously not essential.

The shaft 20 of the filter member 13 has an appropriate hydrodynamic profile on its downstream side. Its upstream end is inserted into the hub 21 which carries it, with appropriate bearings disposed between them, and is keyed axially to the hub 21.

A cap 45 with an appropriate hydrodynamic profile is fitted to the upstream end of the hub 21.

To support it the hub 21 is joined to the cylinder constituting the filter body 11 by radial arms 46 which have an appropriate hydrodynamic profile and subtend an angle of 120° and a box-section constituting the suction unit 14 disposed at 120° relative to the previously mentioned arms 46 and constituting a third supporting arm for the hub 21.

The box-section forming the suction unit 14 is substantially vertical and directed downwards. As seen in elevation, it has a triangular contour occupying an angular sector of the filter member 13.

At its base, that is to say where it passes through the cylinder constituting the filter body 12, this box-section is connected to an associated take-off pipe 15.

The take-off pipe 15 is substantially radial and at its end is the usual rim 47 for connecting it through a valve 49 and a pipe (not shown) to a suction arrangement (also not shown) adapted to direct to a drain the flow from the suction unit 14.

On the side towards the filter member 13 the box-section constituting the suction unit 14 is substantially flush with the rim 22 and the radial members 23 of the filter member 13 and there is an aperture 48 in its corresponding wall.

The contour of the aperture 48 is generally rectangular, forming an elongate slot disposed substantially along a radius of the filter member 13.

The aperture 48 may be surrounded by a flexible material lip seal which, carried by the box-section constituting the suction unit 14, is adapted to form a seal between the latter and the filter member 13.

In service, the filter member 13 is normally stationary and the valve 49 controlling the take-off pipe 15 is closed.

Debris, detritus and foreign bodies carried by the flow treated are held back by the filter element 35 of the filter member 13, to be more precise by the solid parts thereof.

They gradually build up in the compartments 29 of the filter member 13 provided for this purpose.

From time to time, or whenever necessary (as indicated by a timer, for example, or by a sensor responsive to head losses), the filter member 13 is rotated by means of the drive wheel 27 and as shown by the arrow F2 in FIG. 2. At the same time, the valve 49 controlling the take-off pipe 15 is opened so that the box-section constituting the suction unit 14 is sucked out by the suction arrangement to which it is then connected, as schematically represented by the arrow F3 in FIG. 1. As the portions of the filter element 35 of the filter member 13 are successively drawn across the aperture 48 in the suction unit 14, they experience a counter-current flow, as schematically represented by arrows F4 in FIG. 1.

This counter-current flow through the filter element 35 detaches and entrains towards the drain the debris, detritus and foreign bodies previously held back by the filter element 35 and previously retained in the various compartments of the filter member 13.

Thus the filter element 35 is systematically cleaned portion by portion.

It is to be understood that the present invention is not limited to the embodiment described and shown but encompasses any variant execution thereof.

Specifically, although the suction unit as described above is operated only from time to time, to minimize the resulting consumption of fluid, the scope of the invention would not be exceeded by having it operate continuously in conjunction with continuous rotation of the filter member 13.

Although the foregoing description indicates that partitions transversely subdivide the angular sectors defined within the space inside the rim by the radial members of the filter member into separate compartments, the partitions are not indispensable and can be used, for example, only if the size of the filter member makes this necessary.

For proper storage of debris, detritus and foreign bodies held back by the filter panel between two operations of the suction unit, the space inside the rim has to be divided into a plurality of compartments, irrespective of the type and/or contour of the partitions defining these compartments.

There is claimed:

1. A self-cleaning filter adapted to be inserted into a pipe, comprising a filter body adapted to be connected to each of two generally aligned consecutive sections of the pipe and, in said filter body, a generally circular disclike filter membr, means mounting siad filter member for rotation about an axis of said filter body, cantilever means supporting said means mounting said filter membr for rotation, said filter member having a rim, a gear rack being provided on said rim, a drive gearwheel meshing with said rack, a suction unit disposed on an upstream side and disposed radially of, said filter member for removing foreign bodies held back by said filter member, and a take-off pipe connected to said suction unit.

2. The filter according to claim 1, wherein said take-off pipe is substantially radial.

3. The filter according to claim 1, wherein said means mounting said filter member for rotation comprises an axial shaft and a hub receiving said shaft, said filter member being fixed at one end of said shaft, and said hub being fied relative to sid filter body by said cantilever means.

4. The filter according to claim 2, wherein said means mounting said filter member for rotation comprise an axial shaft and a hub receiving said shaft, said filter member being at one end of said shaft, aid hub being fixed relative to said filter body by said cantilever means comprising a box-section constituting both a supporting arm for said hub and said suction unit.

5. The filter according to claim 1, where said filter body is cylindrical.

6. The filter according to claim 5, wherein the diameter of said cylindircal filter body is just sufficient to accommodate said filter member having a diameter slightly greater than the diameter of the pipe.

7. The filter according to claim 5, wherein the axial length of said filter body is at most approximately one-half the diameter of the pipe.

8. The filter according to claim 1, wherein said filter member comrprises a filter element having openings each individually delimited by parallel elongate passages substantially perpendicular to the plane of said openings.

9. The filter according to claim 1, wherein the space inside said rim of said filter member is subdivided into a plurality of compartments.

* * * * *